(12) United States Patent
Noreikat et al.

(10) Patent No.: US 6,862,887 B2
(45) Date of Patent: Mar. 8, 2005

(54) HYBRID DRIVE

(75) Inventors: Karl-Ernst Noreikat, Esslingen (DE); Tobias Ostertag, Burgstetten (DE); Alfons Rennefeld, Stuttgart (DE)

(73) Assignee: Daimler Chrysler AG, Stuttgart (DE)

( * ) Notice: Subject to any disclaimer, the term of this patent is extended or adjusted under 35 U.S.C. 154(b) by 0 days.

(21) Appl. No.: 10/285,679

(22) Filed: Nov. 1, 2002

(65) Prior Publication Data

US 2003/0106729 A1 Jun. 12, 2003

(30) Foreign Application Priority Data

Nov. 3, 2001 (DE) .......................................... 101 54 147

(51) Int. Cl.$^7$ ............................................... F01B 21/04
(52) U.S. Cl. .......................................... 60/716; 60/718
(58) Field of Search .......................... 60/698, 716, 718; 123/2, 5, 10

(56) References Cited

U.S. PATENT DOCUMENTS

| | | | |
|---|---|---|---|
| 5,934,395 A | | 8/1999 | Koide et al. |
| 6,114,784 A | * | 9/2000 | Nakano ........................ 310/59 |
| 6,251,037 B1 | * | 6/2001 | Baumgaertner et al. ........ 475/2 |
| 6,527,659 B1 | * | 3/2003 | Klemen et al. ................. 475/5 |
| 6,543,561 B1 | * | 4/2003 | Pels et al. ................. 180/65.2 |

FOREIGN PATENT DOCUMENTS

| | | |
|---|---|---|
| DE | 37 37 192 A1 | 7/1988 |
| DE | 41 24 479 A1 | 1/1993 |
| DE | 696 08 200 T2 | 4/1997 |
| DE | 199 37 545 A1 | 2/2000 |
| DE | 199 05 366 C2 | 8/2000 |
| DE | 199 16 489 A1 | 10/2000 |
| EP | 0 677 414 A2 | 10/1995 |
| EP | 0 791 495 A2 | 8/1997 |
| EP | 0 769 403 B1 | 5/2000 |

OTHER PUBLICATIONS

"VDI–Berichte" Nr. 1565, Jg. 2000, S. 627–648.

German Patent Office Opposition Paper I.

German Patent Office Opposition Paper II.

* cited by examiner

Primary Examiner—Hoang Nguyen

(57) ABSTRACT

Hybrid drive containing a clutch between an engine power-output shaft (4) and a transmission power-input shaft (16) arranged axially with respect to the said power-output shaft; a first electric machine (6) connected to the engine power-output shaft (4) in a torque-transmitting manner; a second electric machine (14) connected to the transmission power-input shaft (16) in a torque-transmitting manner; preferably also a torsional vibration damper (8), which is connected in a rotationally fixed manner to the engine power-output shaft (4), the first-electric machine (6) being connected to the engine power-output shaft (4) in a torque-transmitting manner, ahead of the torsional vibration damper (8) in terms of the direction in which the torsional vibration damper (8) transmits the power of the propulsion drive engine. The parts of the hybrid drive are nested axially one inside the other.

33 Claims, 4 Drawing Sheets

HYBRID DRIVE

This application claims the priority of German Patent Document No. 101 54 147.3-22, filed Nov. 3, 2001, the disclosure of which is expressly incorporated by reference herein.

BACKGROUND AND SUMMARY OF THE INVENTION

The invention relates to a hybrid drive, in particular for motor vehicles.

Accordingly, the invention relates to a hybrid drive, in particular for motor vehicles, containing a power-output shaft of a propulsion drive engine; a transmission input shaft arranged axially with respect to the engine power-output shaft; an engageable clutch, which is arranged coaxially with the rotational center line of the engine shaft and the transmission power-input shaft for the purpose of connecting the two shafts in a torque-transmitting manner; a first electric machine, which has a stator and a rotor that is connected or can be connected to the engine power-output shaft in a torque-transmitting manner.

DE 199 05 366 C2 discloses a hybrid drive. It shows a crankshaft of a combustion engine, which can be connected in a torque-transmitting manner, by a clutch, to a transmission input shaft arranged axially with respect to it. A torsional vibration damper is arranged in the connection between the crankshaft and the primary part of the clutch. The single electric machine is an internal-rotor machine (rotor radially inside a stator). The rotor of the electric machine is connected to the crankshaft in a torque-transmitting manner, ahead of the torsional vibration damper in terms of the direction of power transmission of the propulsion drive engine.

DE 41 24 479 A1 discloses a hybrid drive in which an engine power-output shaft of a propulsion drive engine is connected in a torque-transmitting manner via a planetary transmission to a transmission power-output shaft arranged axially relative to the planetary transmission. The rotor of a second electric machine, which is arranged coaxially to the transmission power-output shaft, is furthermore likewise connected in a torque-transmitting manner to the transmission power-output shaft via the planetary transmission. The planetary transmission can be locked up by means of an engageable clutch. Both electric machines are internal-rotor machines, which have a rotor arranged within a stator.

The prior art also includes a hybrid concept, which is illustrated in FIG. 4. In this concept, the crankshaft of a combustion engine (VM) is connected to an intermediate shaft via a torsional vibration damper (TD). The intermediate shaft is provided with two clutches (K1, K2). A first electric machine (EM1) and a pump (P) can be connected by means of one clutch (K1), and a transmission input shaft of an automatic transmission (AT) can be connected by means of the second clutch (K2). A second electric machine (EM2) is connected to the transmission input shaft in a torque-transmitting manner. This hybrid concept is shown on page 635 of a book entitled "VDI Berichte" [VDI Reports] published in 2000.

The invention is intended to construct a hybrid drive in such a way that it requires less installation space while providing at least the same drive transmission power.

The reduction in installation space should preferably be such that at least two electric machines, a clutch between two shafts arranged axially with respect to one another, and preferably also a torsional vibration damper can be accommodated in a case, in particular a case bell. This case has previously been used to accommodate a torque converter for an automatic transmission, which can be driven by the transmission power-input shaft, preferably by the transmission input shaft itself. The engine power-output shaft is preferably the crankshaft of a combustion engine or a shaft that is connected or can be connected in a torque-transmitting manner to the crankshaft.

The invention preferably has just a single clutch. Moreover a shorter overall length is achieved without the need to enlarge the overall diameter. Because of the combination of two or more electric machines arranged in accordance with the invention, it is possible to replace the previously customary torque converter for automatic transmissions. One of the electric motors is connected or can be connected in a torque-transmitting manner to the engine power-output shaft, the other is connected or can be connected in a torque-transmitting manner to the transmission power-input shaft, and a single engageable clutch is disposed between the two shafts.

The first electric machine, which is connected or can be connected in a torque-transmitting manner to the engine power-output shaft, is preferably designed as a starter for starting the combustion engine. At least one but preferably both electric machines are preferably integrated into a circuit in such a way that they can be used as an electric motor or as a generator for generating current, depending on the driving situation of the motor vehicle. In the generator mode, the two electric machines can be driven by the mass of the motor vehicle when the motor vehicle is in motion in order to recover the energy. When the vehicle is stationary and the clutch is disengaged, the first electric machine can generate current as a generator because of the running combustion engine. Both electric machines can be used for so-called impulse starts when the motor vehicle is operating in stop-and-go conditions. The second electric machine can be used to drive the motor vehicle for longer periods with the combustion engine disengaged.

Advantages and novel features of the present invention will become apparent from the following detailed description of the invention when considered in conjunction with the accompanying drawings.

DETAILED DESCRIPTION OF THE DRAWINGS

Figure 1:
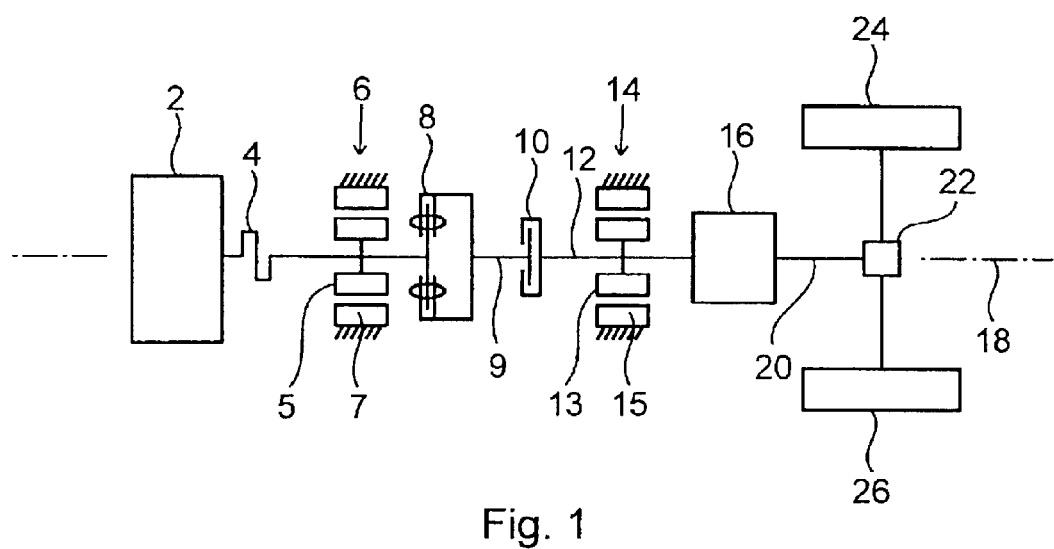
FIG. 1 shows a schematic representation of a hybrid drive according to the invention.

FIG. 1 shows a hybrid drive, which contains the following elements arranged in the direction of power transmission of a propulsion drive engine 2 (preferably a combustion engine): an engine power-output shaft 4, preferably a crankshaft of the combustion engine, a first electric machine 6, a torsional vibration damper 8, an engageable propulsion drive clutch 10, a transmission power-input shaft 12, preferably a transmission input shaft, a second electric machine 14 and a propulsion drive transmission 16. These elements are all arranged axially relative to a rotational center line 18. A transmission output shaft 20 can drive vehicle wheels 24 and 26 via a differential 22.

The rotor 5 of the first electric machine 6 is arranged coaxially with respect to the engine power-output shaft 4 and is connected in a torque-transmitting manner to the engine power-output shaft 4 by a first rotor carrier 9, in the form of a plate or dish, for example, which has a central opening. The rotor 13 of the second electric machine 14 is arranged coaxially with respect to the transmission power-input shaft 12 and is connected to the latter by a second rotor carrier 19, in the form of a plate or dish, for example, which has a central opening.

At least one of the two electric machines 6 and 14, preferably both in accordance with drawings, are internal-rotor machines. Their rotors 5 and 13 are arranged radially within their stators 7 and 15, respectively.

The primary part 9 of the engageable clutch 10 is connected to the engine power-output shaft 4 in a torque-transmitting manner via the torsional vibration damper 8. The rotor 5 of the first electric machine 6 is connected to the engine power-output shaft 4 in a torque-transmitting manner ahead of the torsional vibration damper 8 in terms of the direction of power transmission of the engine torque of the propulsion drive engine 2. As a result, the rotor 5 of the first electric machine 6 is connected to the engine power-output shaft 4 without the damping action of the torsional vibration damper 8.

Figure 2:
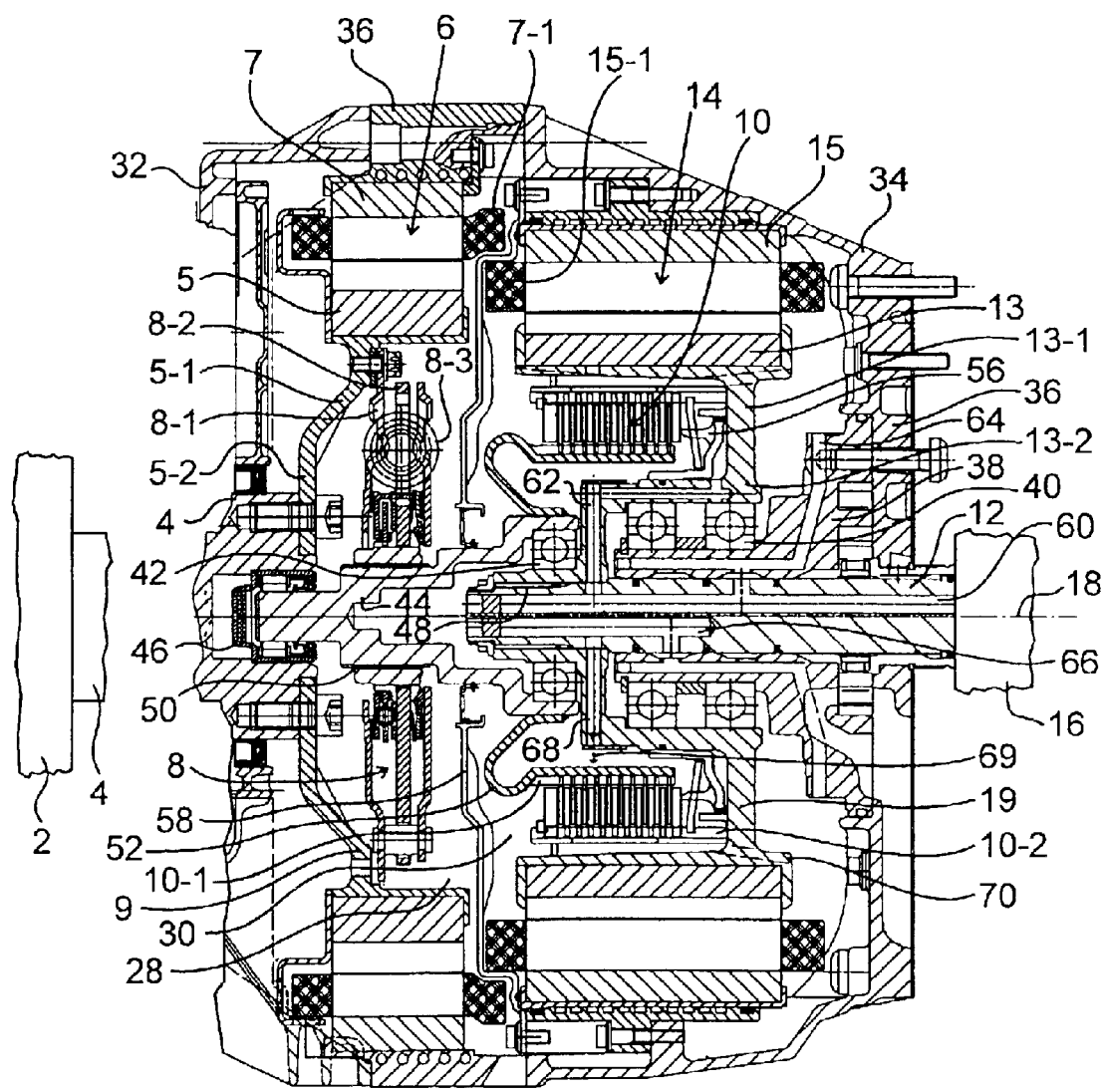
FIG. 2 shows an axial section through a preferred embodiment of a hybrid drive according to the invention.
Figure 3:
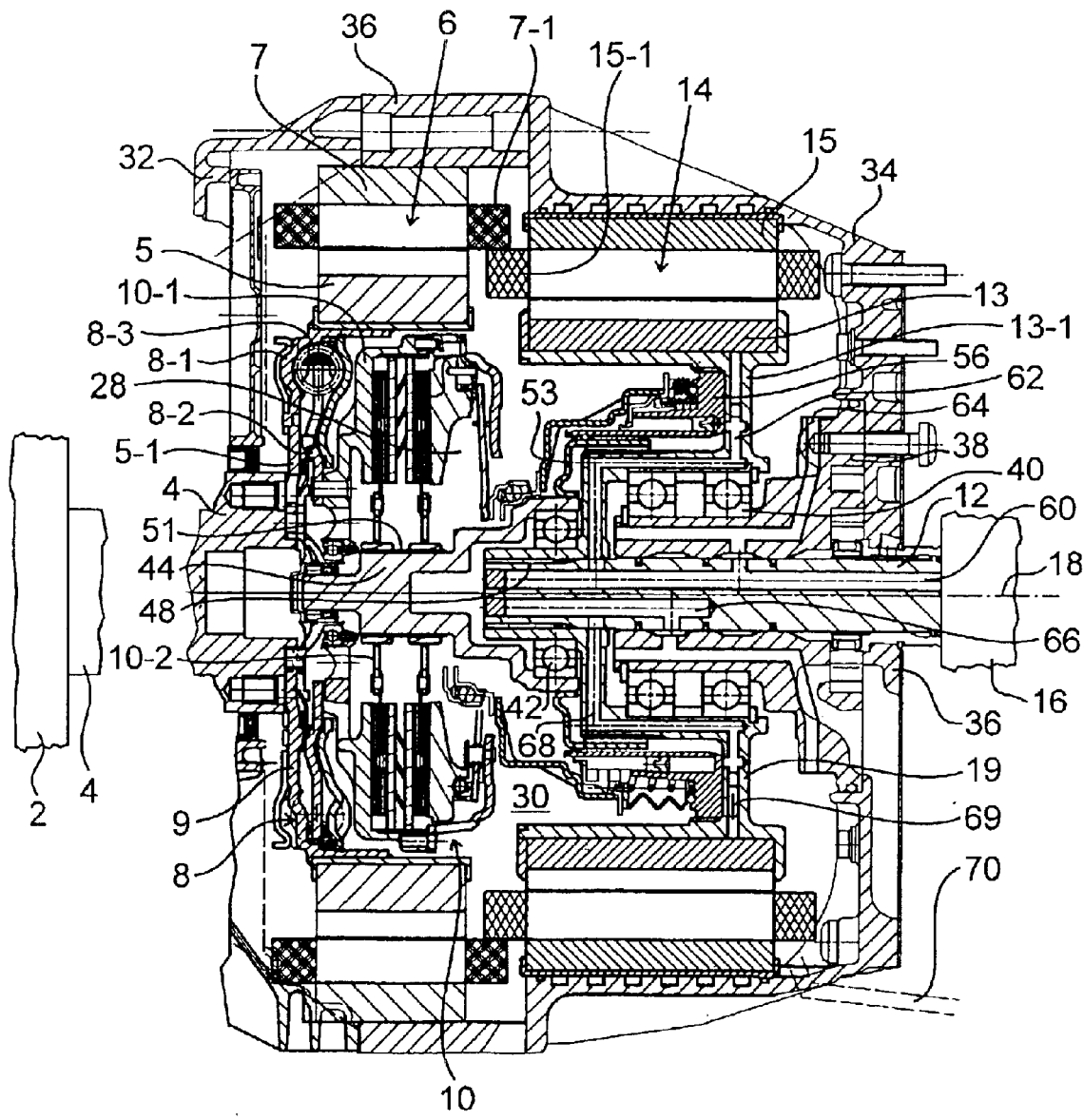
FIG. 3 shows an axial section through a further preferred embodiment of a hybrid drive according to the invention.
Figure 4:
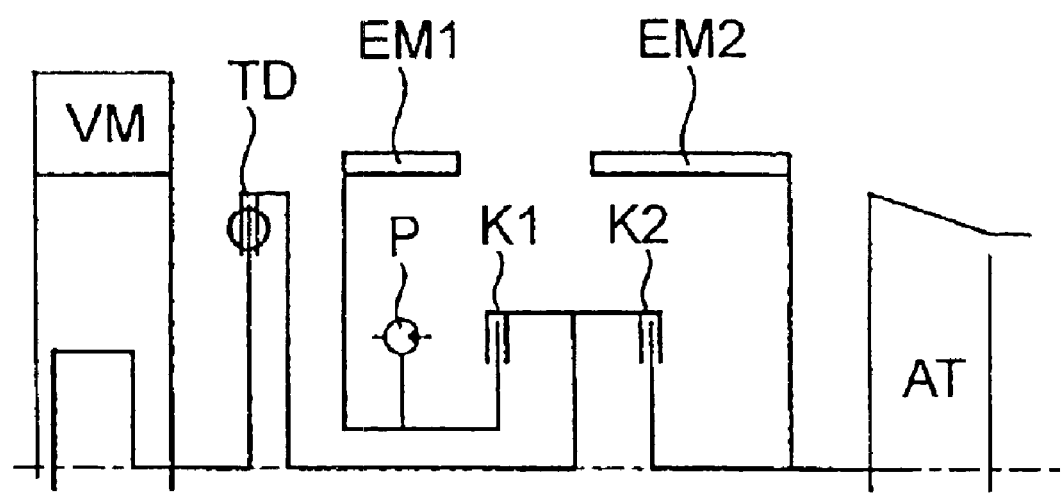
FIG. 4 shows schematically a prior-art hybrid drive.

According to the preferred embodiments of the invention, at least one of the two electric machines, preferably both electric machines 6 and 14, have a cavity 28 and 30, respectively, concentrically to the center line 18, as shown in FIGS. 2 and 4. The torsional vibration damper 18 and/or the clutch 10 can be accommodated and can also be integrated with parts of the rotor. Embodiments of this kind are shown in FIGS. 2 and 3.

FIGS. 2 and 3 show a crankcase 32 and a case bell 34, which are connected to one another either directly or via a tubular intermediate case 36 to form an overall case.

The engine power-output shaft or crankshaft 4 is rotatably mounted in the crankcase 32. The case bell 34 can be the same as that used in prior-art automatic transmissions 16 to accommodate a torque converter. In the bell there is a flange 38 bolted to the bell end 36.

The rotor carrier 19 of the rotor 13 of the second electric machine 14 is rotatably mounted on the flange 38 with a bearing arrangement 40.

One end of an intermediate shaft 44 is rotatably mounted on this rotor carrier 19 of the second electric machine 14 with a further bearing arrangement 42, its other end being centerd and rotatably mounted in the crankshaft 4 by a centering arrangement 46.

The transmission power-input shaft, in this case the transmission input shaft 12 of the transmission 16, is centerd in the rotor carrier 19 of the second electric machine 14 and connected in a rotationally fixed manner to its rotor 13, by axially insertable toothing 48 for example.

At the axially opposite ends of the two rotors 9 and 19, the two rotor carriers 9 and 19 each have a rotor-carrier section 5-1 and 13-1, respectively. These sections are transverse to the center line 18 and delimit the axially outer ends of the cavities 28 and 30, the axially inner ends of which adjoin one another. The cavities 28 and 30 are delimited at their radially outer periphery by the axial extent of the magnet part of the rotor 5 and that of the rotor 13. The cavity 30 of the second electric machine 14 is delimited radially on the inside by a stepped cylindrical rotor-carrier section 13-2, which extends over the bearing arrangement 40 to the toothed coupling or toothing 48 at the driving end of the transmission power-input shaft 12. There the rotor-carrier section 13-2 is connected in a rotationally fixed manner to the driving end of the transmission power-input shaft 12 by the toothing 48. The central cavity 28 of the first electric machine 6 is delimited radially on the inside by the intermediate shaft 44.

The two cavities 28 and 30 thus lie axially between the two rotor-carrier sections 5-1 and 13-1, which extend essentially transversely to the center line 18.

At its radially inner rotor-carrier section 5-2, which can be recessed in a dish shape towards the crankshaft 4, the rotor carrier 9 of the first electric machine 6 is secured in a rotationally fixed manner on this crankshaft 4 with bolts for example.

The stator 7 of the first electric machine 6 is secured in a rotationally fixed manner on the intermediate case 36 (or the crankcase 32). The stator 15 of the second electric machine 14 is secured in a rotationally fixed manner on the case bell 34.

The two electric machines 6 and 14 are preferably arranged in such a way as to overlap over part of their axial length. According to the preferred embodiments in the FIGS. 2 and 3, the mutually adjacent end turns 7-1 and 15-1 are arranged in such a way as to overlap axially.

Special Features of FIG. 2:

In the embodiment in FIG. 2, the torsional vibration damper 8 is accommodated in the cavity 28 completely within the essentially cylindrically tubular rotor 5 of the first electric machine 6 in the axial and radial directions. The torsional vibration damper 8 has a primary part 8-1 secured in a rotationally fixed manner on the radially outer end of the rotor carrier 9 of the first electric machine 6, a secondary part 8-2 secured in a rotationally fixed manner on the intermediate shaft 44, with a toothed plug coupling 50 for example, and spring elements 8-3 for transmitting torque between the primary part 8-1 and the secondary part 8-2.

The clutch 10 is accommodated completely within the central cavity 30, which is delimited radially on the outside by the rotor 13 of the second electric machine 14, and at the rear end of the latter by the radially outer rotor-carrier section 13-1 and the radially inner cylindrical rotor-carrier section 13-2 of the second machine 14.

The clutch 10 has a primary part 10-1 and a secondary part 10-2. The primary part 10-1 is connected in a rotationally fixed manner, e.g. welded, to the intermediate shaft 44 by a connecting tube 52 of corrugated-tube-type construction, which is axially flexible but rigid in the circumferential direction. This clutch primary part 10-1 is thus connected in a rotationally fixed manner to the secondary part 8-2 of the torsional vibration damper 8 by the intermediate shaft 44. The secondary part 10-2 of the clutch 10 is secured in a rotationally fixed manner on the rotor carrier 19 of the second electric machine 14 and thereby connected in a rotationally fixed manner to the transmission power-input shaft 16.

To actuate the clutch 10, an actuating device 56 (clutch operator) is used, which can, for example, be secured on the radial rotor-carrier section 13-1 of the second electric machine 14.

The first electric machine 6 and the torsional vibration damper 8 can be pre-installed in the crankcase 32 and the intermediate case 36. The second electric machine 14, the clutch 10 and the intermediate shaft 44 can be pre-installed in the case bell 34 and then mounted axially on the first pre-installed unit.

In FIG. 2, the two cavities 28 and 30 of the two electric machines 6 and 14 are separated from one another in terms of fluid by a sealing disc 58 arranged transversely to the axial center line 18. As a result, the cavity 28 of the first electric machine 6 can be a dry region, and the cavity 30 of the second electric machine 14 can have a wet region. In this case, the clutch 10 can be designed as a wet clutch without needing a clutch case.

Actuating-oil passages 60, which communicate with actuating-oil passages 62 and 64 are formed in the transmission power-input shaft 16 and in the cylindrical, radially inner rotor-carrier section 13-2 of the second electric machine 14 for the purpose of supplying and carrying away actuating oil to and from the clutch 10.

At least one passage 66 or 68 for supplying cooling oil to the clutch 10 is formed in the transmission power-input shaft 12 and in the rotor-carrier section 13-1. At least one cooling-oil passage 70, through which cooling oil 69, after flowing through and cooling the clutch 10, also flows through the rotor 13 or parts of the latter and thereby likewise cools these, is furthermore formed in the rotor 13 and/or in the rotor-carrier section 13-1 of the second electric machine 14.

Special Features of FIG. 3:

In the case of the embodiment in FIG. 3, not only the torsional vibration damper 8 but also the clutch 10 is arranged axially and radially within the cylindrically tubular rotor 5 of the first electric machine 6. This is also possible within the electric machine 14. The clutch-actuating device 56 can furthermore be secured on the rotor-carrier section 13-1 of the second electric machine 14. In all embodiments, the clutch-actuating device 56 could instead be secured on a part of the case, for example, the case bell 34 or the flange 38 for instance.

In FIG. 3, the primary part 10-1 of the clutch 10 is connected in a rotationally fixed manner to the secondary part 8-2 of the torsional vibration damper 8. The secondary part 10-2 of the clutch 10 is connected in a rotationally fixed manner to the intermediate shaft 44 by a plug-fit toothed coupling 51.

The rear end of the intermediate shaft 44, which is rotatably mounted on the radially inner rotor-carrier section 13-2, is connected in a rotationally fixed manner to this rotor-carrier section 13-2 by a connecting element 53. The connecting element 53 is preferably of corrugated-tube-type construction, similarly to the corrugated-tube-type connecting element 52 in FIG. 2. As a result, the connecting element 53 is axially flexible but rigid in the direction of rotation. This makes it possible to compensate for wobbling movements of the crankshaft 4.

The embodiment in FIG. 3 contains no sealing plate 58 between the two cavities 28 and 30, with a result that they merge axially into one another without any separation. The clutch 10 in FIG. 3 is a dry clutch, for example.

According to another embodiment, it is also possible for a sealing plate 58 to be provided here, as in FIG. 2. In this case, the cavity 28 can be designed as a wet region and the cavity 30 as a dry region or vice versa.

With the exception of the differences described, FIG. 3 is identical to FIG. 2, and the details already described are provided with the same reference numerals in FIG. 3 but are not described again.

In all embodiments, it is also possible, instead of two electric machines, to use more electric machines. External-rotor machines can be used instead of internal-rotor machines.

SUMMARY OF A NUMBER OF FEATURES OF THE INVENTION

The use of two electric machines 6 and 14 designed as internal-rotor machines allows a clutch 10 to be integrated within a rotor of one of these machines.

The inner-plate carrier of the engageable multi-plate clutch 10 in FIG. 2 is secured in a rotationally fixed manner on the intermediate shaft 44 by the flexible tube 52, which compensates for wobbling movements of the intermediate shaft 44.

The invention provides optimum mounting of the entire system in terms of installation space, ensuring that the required installation space is very small.

The interior of the case can be divided into a wet region and a dry region in a simple manner by a sealing disc 58 and an integrated slide ring.

Cooling oil for the clutch 10 can be supplied in a simple manner by a rotor carrier of one of the electric machines, and the cooling of the stators of the electric machines 6, 14 can be accomplished in the same way.

The required installation space can be shortened by overlapping parts of the electric machines axially, in particular their end turns 7-1 and 15-1.

The torsional vibration damper 8 damps torsional vibrations in the drive line and compensates for wobbling movements of the crankshaft 4.

The actuating oil for the clutch 10, which is designed as a multi-plate clutch, can be supplied and the cooling oil carried by radial holes and axial holes in the transmission input shaft and, from there, to the plates of the clutch 10 by the co-rotating rotor carrier of one of the electric machines 6 and/or 14. This enables a hybrid drive of this kind with electric machines to be accommodated in a standard case or a case bell, in which a torque converter has hitherto been accommodated. As a result, no changes to the vehicle are required around the case bell.

The propulsion drive transmission 16 can be or contain a manual or, preferably, automatic transmission.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A hybrid drive comprising:
   an engine power-output shaft of a propulsion drive engine;
   a transmission power-input shaft arranged axially with respect to the engine power-output shaft;
   an engageable clutch, which is arranged coaxially to the rotational center line of the engine power-output shaft and the transmission power-input shaft for the purpose of connecting the two shafts in a torque-transmitting manner;
   a first electric machine coaxial to the rotational center line, which has a stator and a rotor, the rotor of the first electric machine being connectable to the engine power-output shaft in a torque-transmitting manner;
   a second electric machine coaxial to the rotational center line, which has a stator and a rotor, the rotor of the second electric machine being connectable to the transmission power-input shaft in a torque-transmitting manner; and
   a torsional vibrational damper, wherein a primary part of the clutch is connectable in a rotationally fixed manner to the engine power-output shaft via the torsional vibration damper, the rotor of the first electric machine being connectable in a torque-transmitting manner to the engine power-output shaft, ahead of the torsional vibration damper in terms of the direction of power transmission of the propulsion drive engine.

2. The hybrid drive according to claim 1, wherein the torsional vibration damper is arranged at least partially axially and radially within the first electric machine.

3. A hybrid drive comprising:
an engine power-output shaft of a propulsion drive engine;
a transmission power-input shaft arranged axially with respect to the engine power-output shaft;
an engageable clutch, which is arranged coaxially to the rotational center line of the engine power-output shaft and the transmission power-input shaft for the purpose of connecting the two shafts in a torque-transmitting manner;
a first electric machine coaxial to the rotational center line, which has a stator and a rotor, the rotor of the first electric machine being connectable to the engine power-output shaft in a torque-transmitting manner; and
a second electric machine coaxial to the rotational center line, which has a stator and a rotor, the rotor of the second electric machine being connectable to the transmission power-input shaft in a torque-transmitting manner, wherein the clutch is arranged at least partially axially and radially within one of the two electric machines.

4. A hybrid drive comprising:
an engine power-output shaft of a propulsion drive engine;
a transmission power-input shaft arranged axially with respect to the engine power-output shaft;
an engageable clutch, which is arranged coaxially to the rotational center line of the engine power-output shaft and the transmission power-input shaft for the purpose of connecting the two shafts in a torque-transmitting manner;
a first electric machine coaxial to the rotational center line, which has a stator and a rotor, the rotor of the first electric machine being connectable to the engine power-output shaft in a torque-transmitting manner; and
a second electric machine coaxial to the rotational center lines which has a stator and a rotor, the rotor of the second electric machine being connectable to the transmission power-input shaft in a torque-transmitting manner, wherein the clutch is arranged at least partially axially and radially within the second electric machine and is integrated into the second electric machine, a rotor carrier of the second electric machine also being a torque-transmitting part of the clutch.

5. A hybrid drive comprising:
an engine power-output shaft of a propulsion drive engine;
a transmission power-input shaft arranged axially with respect to the engine power-output shaft;
an engageable clutch, which is arranged coaxially to the rotational center line of the engine power-output shaft and the transmission power-input shaft for the purpose of connecting the two shafts in a torque-transmitting manner;
a first electric machine coaxial to the rotational center line, which has a stator and a rotor, the rotor of the first electric machine being connectable to the engine power-output shaft in a torque-transmitting manner; and
a second electric machine coaxial to the rotational center line, which has a stator and a rotor, the rotor of the second electric machine being connectable to the transmission power-input shaft in a torque-transmitting manner, wherein the engine power-output shaft is the crankshaft of a combustion engine.

6. A hybrid drive comprising:
an engine power-output shaft of a propulsion drive engine;
a transmission power-input shaft arranged axially with respect to the engine power-output shaft;
an engageable clutch, which is arranged coaxially to the rotational center line of the engine power-output shaft and the transmission power-input shaft for the purpose of connecting the two shafts in a torque-transmitting manner;
a first electric machine coaxial to the rotational center line, which has a stator and a rotor, the rotor of the first electric machine being connectable to the engine power-output shaft in a torque-transmitting manner; and
a second electric machine coaxial to the rotational center line, which has a stator and a rotor, the rotor of the second electric machine being connectable to the transmission power-input shaft in a torque-transmitting manner, wherein the transmission power-input shaft is a transmission input shaft.

7. A hybrid drive comprising:
an engine power-output shaft of a propulsion drive engine;
a transmission power-input shaft arranged axially with respect to the engine power-output shaft;
an engageable clutch, which is arranged coaxially to the rotational center line of the engine power-output shaft and the transmission power-input shaft for the purpose of connecting the two shafts in a torque-transmitting manner;
a first electric machine coaxial to the rotational center line, which has a stator and a rotor, the rotor of the first electric machine being connectable to the engine power-output shaft in a torque-transmitting manner; and
a second electric machine coaxial to the rotational center line, which has a stator and a rotor, the rotor of the second electric machine being connectable to the transmission power-input shaft in a torque-transmitting manner, wherein the rotor of the second electric machine is rotatably mounted on a non-rotating part, and wherein the rotor of the second electric machine accommodates the transmission power-input shaft.

8. A hybrid drive comprising:
an engine power-output shaft of a propulsion drive engine;
a transmission power-input shaft arranged axially with respect to the engine power-output shaft;
an engageable clutch, which is arranged coaxially to the rotational center line of the engine power-output shaft and the transmission power-input shaft for the purpose of connecting the two shafts in a torque-transmitting manner;
a first electric machine coaxial to the rotational center line, which has a stator and a rotor, the rotor of the first electric machine being connectable to the engine power-output shaft in a torque-transmitting manner; and a second electric machine coaxial to the rotational center line which has a stator and a rotor, the rotor of the second electric machine being connectable to the transmission power-input shaft in a torque-transmitting manner, wherein the two electric machines overlap each other axially.

9. The hybrid drive according to claim 1, wherein the torsional vibration damper is arranged at least partially radially and axially within the first electric machine, and wherein the clutch is arranged at least partially radially and axially within the second electric machine.

10. The hybrid drive according to claim 9, further comprising an intermediate shaft, which has an end centered on the engine power-output shaft and an end centered on a rotor part of the second electric machine, wherein the intermediate shaft is connectable to the secondary part of the torsional vibration damper and to the primary part of the clutch, in each case in a torque-transmitting manner.

11. The hybrid drive according to claim 10, further comprising a flexible connecting element in the drive connection from the intermediate shaft to the primary part of the clutch for the purpose of compensating for wobbling movements of the engine power-output shaft.

12. The hybrid drive according to claim 11, further comprising a sealing disc extending transversely to the rotational center line and separating a dry region and a wet region, the dry and wet regions being axially adjacent to one another in a case, wherein the clutch including a wet clutch, and the clutch and the second electric machine are arranged in the wet region, and wherein the first electric machine and the torsional vibration damper are arranged in the dry region.

13. The hybrid drive according to claim 1, wherein the clutch is arranged on an axial side of the torsional vibration damper that faces axially away from the engine power-output shaft, and wherein the clutch and the torsional vibration damper are each arranged at least partially radially and axially within the first electric machine.

14. The hybrid drive according to claim 13, further comprising an intermediate shaft, which has an end centered on the engine power-output shaft and an end centered on a rotor part of the second electric machine, wherein the intermediate shaft is connectable to the secondary part of the clutch and to the rotor part of the second electric machine, in each case in a torque-transmitting manner.

15. A hybrid drive comprising:
an engine power-output shaft of a propulsion drive engine;
a transmission power-input shaft arranged axially with respect the engine power-output shaft;
an engageable clutch, which is arranged coaxially to the rotational center line of the engine power-output shaft and the transmission power-input shaft for the purpose of connecting the two shafts in a torque-transmitting manner;
a first electric machine coaxial to the rotational center line, which has a stator and a rotor, the rotor of the first electric machine being connectable to the engine power-output shaft in a torque-transmitting manner;
a second electric machine coaxial to the rotational center line, which has a stator and a rotor, the rotor of the second electric machine being connectable to the transmission power-input shaft in a torque-transmitting manner; and
an actuating-oil passage in the transmission power-input shaft for supplying actuating oil to the clutch in order to actuate the clutch.

16. A hybrid drive comprising:
an engine power-output shaft of a propulsion drive engine;
a transmission power-input shaft arranged axially with respect to the engine power-output shaft;
an engageable clutch, which is arranged coaxially to the rotational center line of the engine power-output shaft and the transmission power-input shaft for the purpose of connecting the two shafts in a torque-transmitting manner;
a first electric machine coaxial to the rotational center line, which has a stator and a rotor, the rotor of the first electric machine being connectable to the engine power-output shaft in a torque-transmitting manner;
a second electric machine coaxial to the rotational center line, which has a stator and a rotor, the rotor of the second electric machine being connectable to the transmission power-input shaft in a torque-transmitting manner; and
at least one cooling-oil passage in the transmission power-input shaft for supplying cooling oil to the clutch.

17. The hybrid drive according to claim 16, further comprising a cooling-oil path from the clutch to at least one of the two electric machines, via which path, after leaving the clutch, cooling oil can flow to this electric machine and along parts of this electric machine in order to cool this electric machine.

18. The hybrid drive according to claim 7, wherein the non-rotating part includes a case or an element secured on the case.

19. The hybrid drive according to claim 8, wherein at least the end turns of their electrical windings being arranged in such a way as to overlap axially.

20. A method of making a hybrid drive comprising:
disposing a transmission power-input shaft axially with respect to an engine power-output shaft;
disposing an engageable clutch coaxially to the rotational center line of the engine power-output shaft and the transmission power input-shaft for the purpose of connecting the two shafts in a torque-transmitting manner;
arranging a first electric machine coaxial to the rotational center line, which has a stator and a rotor, the rotor of the first electric machine being connectable to the engine power-output shaft in a torque-transmitting manner;
arranging a second electric machine coaxial to the rotational center line, which has a stator and a rotor, the rotor of the second electric machine being connectable to the transmission power-input shaft in a torque-transmitting manner; and
providing a torsional vibrational damper, wherein a primary part of the clutch is connectable in a rotationally fixed manner to the engine power-output shaft via the torsional vibration damper, the rotor of the first electric machine being connectable in a torque-transmitting manner to the engine power-output shaft, ahead of the torsional vibration damper in terms of the direction of power transmission of the propulsion drive engine.

21. The method according to claim 20, further comprising arranging the torsional vibration damper at least partially axially and radially within the first electric machine.

22. A method of making hybrid drive comprising:
disposing a transmission power-input shaft axially with respect to an engine power-output shaft;
disposing an engageable clutch coaxially to the rotational center line of the engine power-output shaft and the transmission power-input shaft for the purpose of connecting the two shafts in a torque-transmitting manner;

arranging a first electric machine coaxial the rotational center line, which has a stator and a rotor, the rotor of the first electric machine being connectable to the engine power-output shaft in a torque-transmitting manner;

arranging a second electric machine coaxial to the rotational center line, which has a stator and a rotor, the rotor of the second electric machine being connectable to the transmission power-input shaft in a torque-transmitting manner; and arranging the clutch at least partially axially and radially within one of the two electric machines.

23. A method of making hybrid drive comprising:

disposing a transmission power-input shaft axially with respect to an engine power-output shaft;

disposing an engageable clutch coaxially to the rotational center line of the engine power-output shaft and the transmission power-input shaft for the purpose of connecting the two shafts in a torque-transmitting manner;

arranging a first electric machine coaxial to the rotational center line, which has a stator and a rotor, the rotor of the first electric machine being connectable to the engine power-output shaft in a torque-transmitting manner;

arranging a second electric machine coaxial to the rotational center line, which has a stator and a rotor, the rotor of the second electric machine being connectable to the transmission power-input shaft in a torque-transmitting manner; and arranging the clutch at least partially axially and radially with in the second electric machine and is integrated into the second electric machine, a rotor carrier of the second electric machine also being a torque-transmitting part of the clutch.

24. A method of making a hybrid drive comprising:

disposing a transmission power-input shaft axially with respect to an engine power-output shaft;

disposing an engageable clutch coaxially the rotational center line of the engine power-output shaft and the transmission power input shaft for the purpose of connecting the two shafts in a torque-transmitting manner;

arranging a first electric machine coaxial to the rotational center line, which has a stator and a rotor, the rotor of the first electric machine being connectable to the engine power-output shaft in a torque-transmitting manner;

arranging a second electric machine coaxial to the rotational center line, which has a stator and a rotor, the rotor of the second electric machine being connectable to the transmission power-input shaft in a torque-transmitting manner; and rotatably mounting the rotor of the second electric machine on non-rotating part, wherein the rotor of the second electric machine accommodates the transmission power-input shaft.

25. A method of making hybrid drive comprising:

disposing a transmission power-input shaft axially with respect to an engine power-output shaft;

disposing an engageable clutch coaxially to the rotational center line of the engine power-output shaft and the transmission power-input shaft for the purpose of connecting the two shafts in a torque-transmitting manner;

arranging a first electric machine coaxial to the rotational center line, which has a stator and a rotor, the rotor of the first electric machine being connectable to the engine power-output shaft in a torque-transmitting manner; and arranging a second electric machine coaxial to the rotational center line, which has a stator and a rotor, the rotor of the second electric machine being connectable to the transmission power-input shaft in a torque-transmitting manner, wherein the two electric machines overlap each other axially.

26. The method according to claim 20, further comprising arranging the torsional vibration damper at least partially radially and axially within the first electric machine, and arranging the clutch at least partially radially and axially within the second electric machine.

27. The method according to claim 26, further comprising providing an intermediate shaft, which has an end centered on the engine power-output shaft and an end centered on a rotor part of the second electric machine, wherein the intermediate shaft is connectable to the secondary part of the torsional vibration damper and to the primary part of the clutch, in each case in a torque-transmitting manner.

28. The method according to claim 27, further comprising providing a flexible connecting element in the drive connection from the intermediate shaft to the primary part of the clutch for the purpose of compensating for wobbling movements of the engine power-output shaft.

29. The method according to claim 28, further comprising using a sealing disc extending transversely to the rotational center line to separate a dry region and a wet region, the dry and wet regions being axially adjacent to one another in a case, placing the clutch and the second electric machine in the wet region, and placing the first electric machine and the torsional vibration damper in the dry region.

30. The method according to claim 20, further comprising arranging the clutch on an axial side of the torsional vibration damper that faces axially away from the engine power-output shaft, and arranging each of the clutch and the torsional vibration damper at least partially radially and axially within the first electric machine.

31. A method of making a hybrid drive comprising:

disposing a transmission power-input shaft axially with respect to an engine power-output shaft;

disposing an engageable clutch coaxially to the rotational center line of the engine power-output shaft and the transmission power-input shaft for the purpose of connecting the two shafts in a torque-transmitting manner;

arranging a first electric machine coaxial to the rotational center line, which has a stator and a rotor, the rotor of the first electric machine being connectable to the engine power-output shaft in a torque-transmitting manner;

arranging a second electric machine coaxial to the rotational center line, which has a stator and a rotor, the rotor of the second electric machine being connectable to the transmission power-input shaft in a torque-transmitting manner; and providing an actuating-oil passage in the transmission power-input shaft for supplying actuating oil to the clutch in order to actuate the clutch.

32. A method of making hybrid drive comprising:

disposing a transmission power-input shaft axially with respect to an engine power-output shaft;

disposing an engageable clutch coaxially to the rotational center line of the engine power-output shaft and the transmission power-input shaft for the purpose of connecting the two shafts in a torque-transmitting manner;

arranging a first electric machine coaxial to the rotational center line, which has a stator and a rotor, the rotor of the first electric machine being connectable to the engine power-output shaft in a torque-transmitting manner;

arranging a second electric machine coaxial to the rotational center line, which has a stator and a rotor, the rotor of the second electric machine being connectable to the transmission power-input shaft in a torque-transmitting manner; and providing at least one cooling-oil passage in the transmission power-input shaft for supplying cooling oil to the clutch.

33. The method according to claim 32, further comprising providing a cooling-oil path from the clutch to at least one of the two electric machines, via which path, after leaving the clutch, cooling oil can flow to this electric machine and along parts of this electric machine in order to cool this electric machine.

* * * * *